(12) United States Patent
Gaudfrin

(10) Patent No.: US 11,065,567 B2
(45) Date of Patent: Jul. 20, 2021

(54) SECTOR HAVING PROGRESSIVE THICKNESS

(71) Applicant: GAUDFRIN, Saint Germain en Laye (FR)

(72) Inventor: Guy Gaudfrin, Saint Nom la Breteche (FR)

(73) Assignee: GAUDFRIN, Saint Germain en Laye (FR)

( * ) Notice: Subject to any disclaimer, the term of this patent is extended or adjusted under 35 U.S.C. 154(b) by 0 days.

(21) Appl. No.: 15/741,429

(22) PCT Filed: Jul. 3, 2015

(86) PCT No.: PCT/FR2015/051856
§ 371 (c)(1),
(2) Date: Jan. 2, 2018

(87) PCT Pub. No.: WO2017/005989
PCT Pub. Date: Jan. 12, 2017

(65) Prior Publication Data
US 2018/0369725 A1 Dec. 27, 2018

(51) Int. Cl.
*B01D 33/23* (2006.01)

(52) U.S. Cl.
CPC ................ *B01D 33/23* (2013.01)

(58) Field of Classification Search
CPC ........ B01D 33/23; B01D 33/00; B01D 33/21; B01D 33/25; B01D 33/35; B01D 33/37; B01D 33/39
USPC ................ 210/359, 398, 331, 345, 487, 486
See application file for complete search history.

(56) References Cited

U.S. PATENT DOCUMENTS

| 2,781,133 | A | * | 2/1957 | Thompson | 210/395 |
| 4,655,920 | A | | 4/1987 | Ragnegård | |
| 4,865,732 | A | * | 9/1989 | Garrant | B01D 33/23 210/232 |
| 5,647,982 | A | | 7/1997 | Haythornthwaite | |
| 2005/0082217 | A1 | * | 4/2005 | Hagg | B01D 33/23 210/331 |

FOREIGN PATENT DOCUMENTS

| DE | 3706402 C1 | 7/1988 |
| JP | S56-10913 U | 7/1979 |

(Continued)

OTHER PUBLICATIONS

International Search Report and Written Opinion for PCT Patent App. No. PCT/FR2015/051856 (dated Mar. 16, 2016), with English language translation of the ISR.

*Primary Examiner* — Madeline Gonzalez
(74) *Attorney, Agent, or Firm* — Kenealy Vaidya LLP

(57) ABSTRACT

Some embodiments relate to a filtering sector for a filtering disc of a rotary filter, which includes: a structural element made up of a ribbed inner draining medium and a frame that surrounds the draining medium, which is provided with a connecting tube; and a filtering fabric that covers the structural element, wherein the structural element has a thickness which increases progressively towards the connecting tube and in that the draining medium is made up of a single sheet. The draining medium is made up of a single ribbed sheet provided with an alternation of channels, the depth of which increases as it gets closer to the mouth of the tube of the medium.

15 Claims, 3 Drawing Sheets

(56) References Cited

FOREIGN PATENT DOCUMENTS

| JP | S56-10913 A | 2/1981 |
|----|-------------|--------|
| JP | S59-186615 A | 10/1984 |
| WO | WO87/04640 A1 | 8/1987 |

* cited by examiner

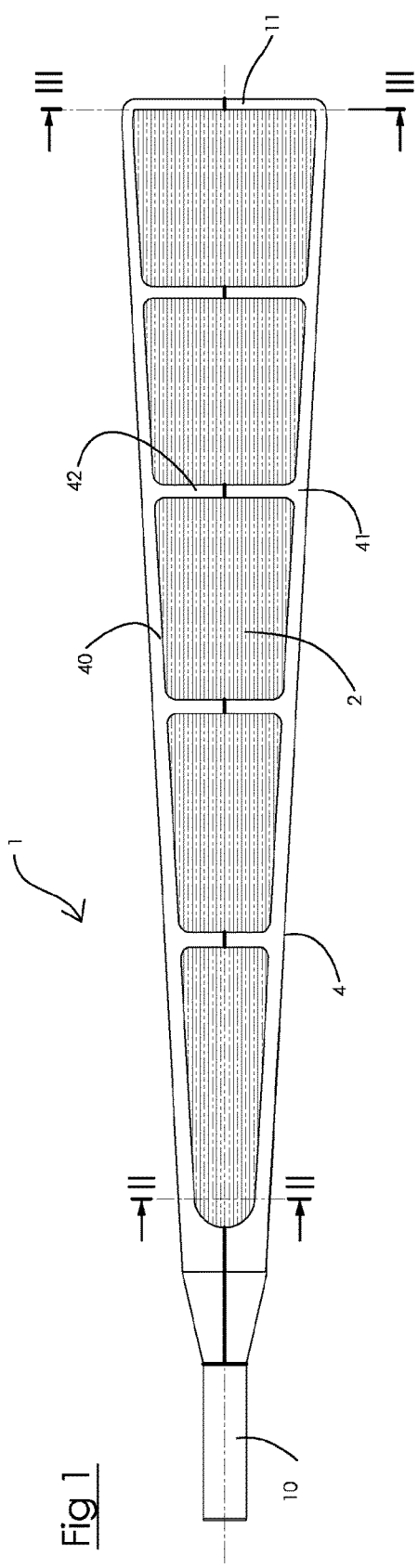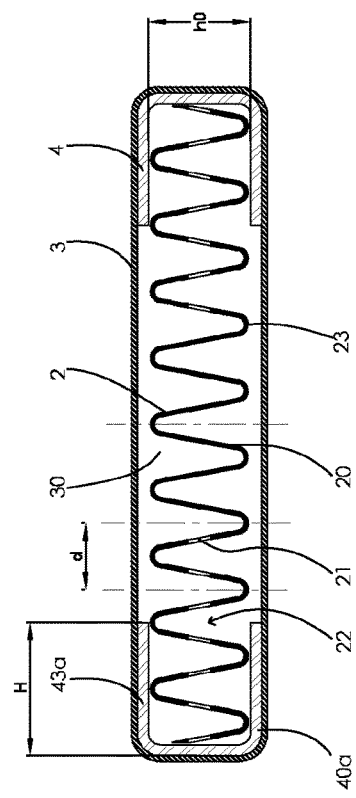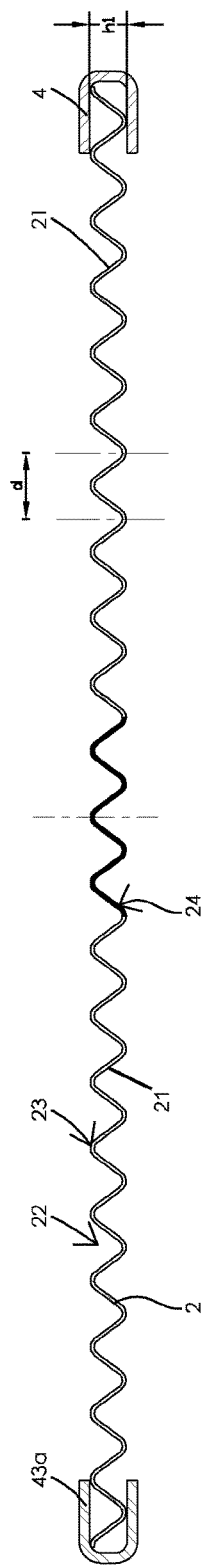

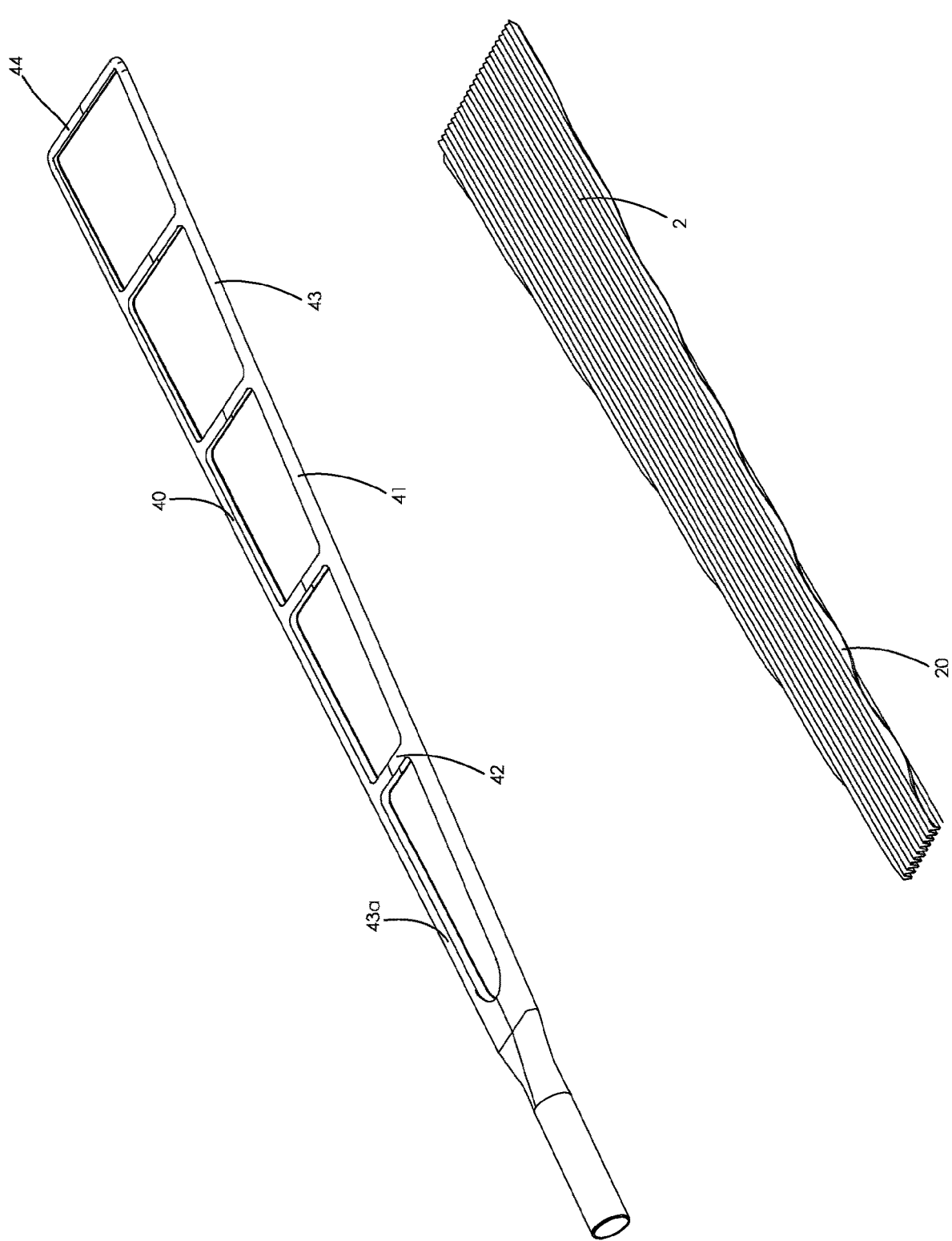

SECTOR HAVING PROGRESSIVE THICKNESS

CROSS REFERENCE TO RELATED APPLICATION(S)

This application is a national phase filing under 35 C.F.R. § 371 of and claims priority to PCT Patent Application No. PCT/FR2015/051856, filed on Jul. 3, 2015, the content of which is hereby incorporated in its entirety by reference.

BACKGROUND

Some embodiments relate to a sector for a filtering disk, and more particularly to a structural element in the form of a sector which is designed to be assembled with sectors of the same type, in order to form a disk of a rotary filter, including at least one disk, used in an industrial installation for liquid-solid separation under vacuum or under pressure.

The sectors are generally constituted by a structural element covered by a filtering fabric. The structural element includes firstly a rigid inner draining support which supports the filtering fabric and ensures the flow of the liquid filtrate, and secondly a frame which delimits the draining support, and is provided with a tube for connection to a shaft which ensures both collection of the filtrate and rotation of the sector. The thickness of the draining support is generally constant.

A related art device uses a single corrugated metal sheet, the radial corrugations of which form channels with a constant depth delimiting the inner volume of the draining support and ensuring the flow of the liquid.

FR 2 567 039 discloses that it enhances this related art device by producing sectors with a variable thickness.

More specifically, the draining support of each sector has a thickness which increases from its edge which is furthest from the center of the disk, known as the outer edge, as far as the mouth of its tube for connection to the shaft.

The purpose of this characteristic is to increase the thickness of the sector progressively along its radius in order to guarantee a cross-section of passage which is sufficient at the mouth of the tube for connection to the rotary shaft, and thus to enhance or optimize the discharge flow rate of the liquid phase.

In this document, this aim is achieved by an embodiment in which the two faces delimiting the inner compartment of the sector are constituted by panels (for example made of an corrugated metal sheet), which are assembled by being inclined relative to one another in order to obtain the variation of thickness required, and are retained by braces.

SUMMARY

Although sectors with a variable thickness of this type enhance or improve the performance and yield of the filtering process, they continue to be very heavy because of the fact that they include two metal sheet panels for support of the filtering fabric.

With sectors of this type, because of their weight, the phases of maintenance, and in particular their replacement on the disks, are difficult and laborious operations which give rise to tooling stresses, and taking of increased safety measures which require the presence of at least two operators.

The weight of these sectors limits their size, and therefore also the size of the filters in which they are placed.

Some embodiments address or solve these technical problems satisfactorily and efficiently by proposing a solution which makes it possible to simplify and lighten the structure of the sectors, while maintaining the hydraulic advantages associated with its variation of thickness.

Some embodiments address or accomplish the above by providing a filtering sector for a filtering disk of a rotary filter including:
a structural element constituted by a ribbed inner draining support and a frame surrounding the draining support which is provided with a connection tube; and
a filtering fabric which covers the structural element.

The structural element has a thickness which increases progressively in the direction of the connection tube, and the draining support is constituted by a single metal sheet. The draining support is constituted by a single ribbed metal sheet provided with an alternation of channels, the depth of which increases as they get closer to the mouth of its tube.

Use of the embodiments within the context of a liquid-solid separation process using rotary disk filters makes it possible to lighten the sectors of the filters, while enhancing or optimizing the discharge flow rate of the filtrate, and consequently enhancing or improving the yield of the process. In addition, the maintenance operations are simplified and facilitated by the decrease in the weight of the sectors. Also, the thinner profile of the sector provides it with flexibility which reduces the risks of breakage of the sector under load.

Advantageously, the draining support is perforated by aligned holes, the diameter of which increases in phase with the thickness of the sector. These perforations facilitate the flow of the liquids in the sector, and are placed in the walls of the channels. Since the flow rate of the fluids or liquid filtrates increases as it gets closer to the connection tube, the increase in the diameters of the holes in the same direction improves this flow.

Advantageously, the frame is constituted by only two shells produced by stamping. The periphery of the ribbed metal sheet which constitutes the draining support is covered by the peripheral frame.

Advantageously, the two shells of the frame have a profile in the form of a "U" with sides with a progressive length. The height of the sides of the section in the form of a "U" of the frame increases from the outer edge towards the mouth of the tube, as does the depth of the channels of the ribbed metal sheet. Preferably, the frame is constituted by two identical shells which are fixed according to a central axis of the sector, whilst confining the ribbed metal sheet. The two lateral shells of the frame are connected to one another by at least two transverse reinforcements arranged on both sides of the ribbed metal sheet.

The profile in the form of a "U" of the frame constitutes a core, the width of which thus increases in phase with the thickness of the sector. The increase in the width of the core of the section in the form of a "U" of the frame from the outer edge towards the mouth makes it possible to reinforce it in the location where the frame is subjected to the most stress.

According to a first variant, the draining support has channels in the form of a "U".

According to a second variant, the draining support has channels in the form of a "V". In this case, the top of the corrugations has the same radius of curvature on both faces of the ribbed metal sheet. Preferably, according to this variant, the pitch of the corrugations is between 10 and 20 mm.

According to a first embodiment, the channels of the draining support are radiating. This embodiment is advantageous for filtering disks with a small diameter (smaller than 4 m in diameter), since all or most of the channels direct the filtrate directly to the mouth of the sector. In this case, it is not necessary to perforate the walls of the channels.

According to a second embodiment, the channels of the draining support are parallel. This second embodiment is better suited than the first to filtering disks with a large diameter (more than 4 m in diameter), since beyond 4 m in diameter, the pitch of the radiating channels increasing from the mouth of the tube towards the outside of the sector would be too great to support the filtering fabric correctly.

Some embodiments are also directed to the rotary filter equipped with a filtering sector with at least one of the preceding characteristics.

BRIEF DESCRIPTION OF THE FIGURES

Other advantages may also become apparent to persons of ordinary skill in the art from reading the following examples, illustrated by the appended figures, provided by way of example:

FIG. 1 represents a front view of a sector according to the invention;

FIG. 2 is a view in transverse cross-section according to II-II in FIG. 1;

FIG. 3 is a view in transverse cross-section according to III-Ill in FIG. 1;

FIG. 4 represents a view in perspective of the frame of a sector according to the invention;

FIG. 5 is a view in perspective of a draining support of a sector according to the invention.

DETAILED DESCRIPTION OF EXEMPLARY EMBODIMENTS

Figure 6:
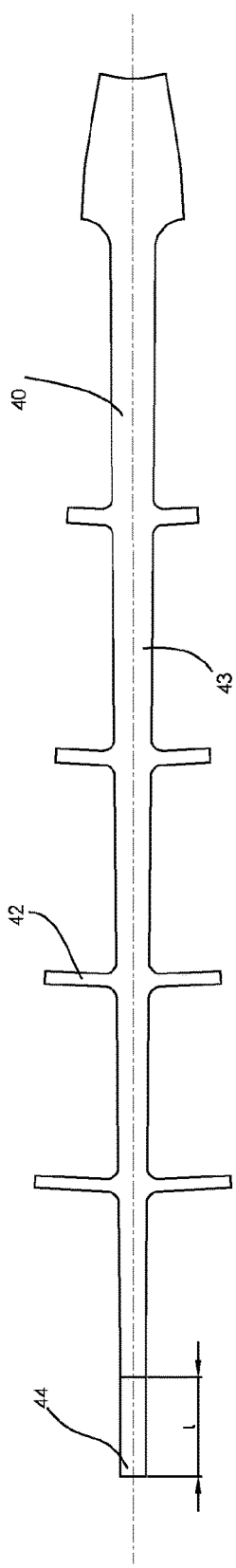
FIG. 6 is a view of one of the shells of the frame in FIG. 4 before the stamping.
Figure 7:
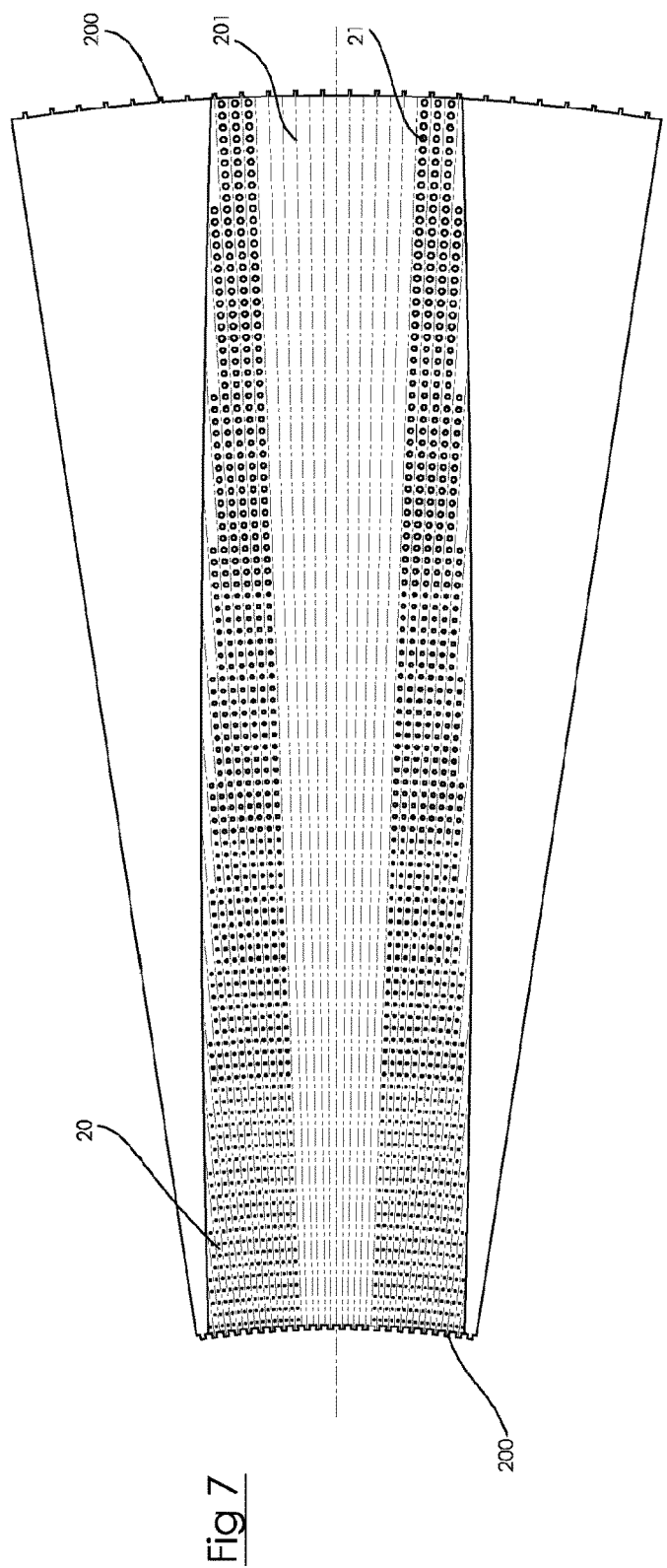
FIG. 7 is a view of the metal sheet of the draining support before its transformation.

Hereinafter in the description, "inside" indicates the side of the sector which is arranged close to the axis of the filter, i.e. the connection tube side, and "outside" indicates the side opposite the axis.

The sector represented in FIG. 1 is designed to be associated with other identical sectors which are all connected to a rotary support and drive shaft of a filter (not represented), which ensures the discharge of the liquid filtrate.

Each sector includes a structural element 1 constituted by a ribbed rigid draining support 2 and a frame 4 which surrounds the draining support 2 and is provided with a connection tube 10. The structural element 1 acts as a support and a bearing device for a filtering fabric 3 (represented in cross-section only in FIG. 2). The filtering fabric 3, supported on the draining support 2, delimits the inner volume of the filtering sector 30 for the flow of the liquid filtrate during implementation of the liquid-solid separation cycle.

The periphery of the draining support 2 constituted by a ribbed metal sheet is covered with a peripheral frame 4 with a transverse cross-section 40a in the form of a "U" which ensures the retention and rigidification of the draining support 2.

The frame 4 is constituted by two symmetrical shells 40 and 41 with wings 42 which constitute reinforcements, and are welded to one another. Each shell 40 or 41 is made from a cut flat metal sheet according to FIG. 6, it is then stamped in order to provide a profile in the form of a "U", and is then welded. The shell 40 illustrated in FIG. 6 includes a core 43 and four wings 42. The shells 40 and 41 can include more or less than four wings. The end 44 of the shells 40 and 41 with a length l is bent after stamping in order to form the end of the frame 4.

The two shells 40 and 41 of the frame 4 are connected by the wings 42 and by the bent end 44 of the frame 4 constituting transverse reinforcements in order to prevent risks of deformation of the sector.

The width of the core 43 of each shell 40 or 41 of the frame 4 increases, on the lateral edges of the frame 4, in order to follow the variation of the depth h of the channels 22 along the draining support 2. Once the core 43 is bent, it has the form of a "U" with two sides 43a.

The height H of the sides 43a of the section in the form of a "U" of the frame 4 also increases on the lateral edges of the frame as it gets closer radially to the mouth of the tube 10 of the sector. This height H can vary for example between 15 and 45 mm.

Preferably, the frame 4 is constituted by two identical shells obtained by stamping a flat metal sheet, which are fixed according to the central axis of the sector, for example by welding, thus confining the draining support 2.

In order to reduce the weight of the sector and enhance or improve the flow of the liquid filtrate, the draining support 2 is constituted by a single ribbed metal sheet 20 provided with an alternation of channels or grooves 22, the depth h of which increases as they get closer to the mouth of the tube 10, as represented in the figures. The depth h0 at the mouth of the tube 10 is greater than the depth h1 at the end 11.

The juxtaposition of these channels 22 which extend from the mouth of the tube 10 to the end 11 on the sector forms globally the draining support 2 for the flow of the liquid filtrate.

The depth of the channels 22 increases as they get closer to the mouth of the tube. The tops 23 of the corrugations which form the channels 22 ensure the support of the filtering fabric 3 locally.

For a sector with a length of between 1.5 and 2.5 m, the depth h of the channels 22 of the draining support 2 can vary for example from 5 mm to 35 mm.

In the embodiment illustrated by the figures, the channels 22 form a series of parallel corrugations with a cross-section substantially in the form of a "V", each top 23 of which has a rounded profile with a radius of curvature of between 2 and 3 mm.

The pitch d of the corrugations, i.e. the distance which separates two consecutive tops 23, is between 10 and 20 mm, and in this case remains invariable along the length of the draining support 2.

However in a variant not represented, it would be possible for the draining support 2 corrugations to have a variable pitch between the outer edge of the sector and its mouth, such that they are thus not necessarily parallel, and could for example be radiating.

The channels 22 are produced by deformation and/or stamping of a flat steel sheet, the thickness of which is between 0.5 and 1.5 mm.

The embodiment of the draining support 2 consists of perforation and bending of a flat metal sheet 20, such as to obtain an corrugated metal sheet forming channels 22 with a progressive height, which are or are not parallel, the walls 24 of which are provided with holes 21. It will be noted that the diameter of the holes 21 increases from one edge to the other of the metal sheet 20 along its length. Finally, the holes 21 are arranged in the walls 24 of the channels 22 such as to facilitate the flow of the filtrate.

Step 1 includes tracing lines of holes 21 and bending generatrices 201. This tracing must firstly guarantee the positioning of the holes 21 in the middle of the walls 24 of the channels 22, and secondly ensure the regularity of the corrugations.

Taking into account the progressive depth of the channels 22, the theoretical evolute is corrected by a non-constant creep factor from one edge to the other along the length of the metal sheet 20.

The creep factor, which varies according to the material, the thickness, and/or a heat treatment, will be adjusted by a series of forming tests.

Step 2 includes cutting and perforating the metal sheet 20, for example by means of a laser or a punch. In this step, guide tongues 200 will also be cut at the ends of the bending generatrices 201.

Step 3 includes forming corrugations, for example by means of a stamping tool provided with a punch and a die.

The height of the punch and the depth of the die increase progressively from one end to the other along the length of the tool, in order to form channels with an increasing thickness.

Consequently, the contact of the punch with the metal sheet 20 takes place progressively from one end of the tool to the other. It is therefore helpful or necessary to guide the metal sheet perfectly from the start to the end of the forming of the channels 22. The guide tongues 200 which are provided at the end of each bending generatrix 201 slide vertically in grooves cut in the die of the tool, thus preventing any lateral displacement of the metal sheet 20. The channels 22 are thus formed one after another, whilst guaranteeing the regularity of the corrugations.

The cycle of liquid-solid separation will now be described as follows:

The inner volume of the filtering sector delimited by the fabric 30 which surrounds it is kept under low pressure during the filtration phase, when the sector is immersed in the solution to be filtered.

During this phase, the filtering fabric 3 is placed against the draining support 2, and the liquid is aspirated through the filtering fabric 3 to the inner volume of the sector 30, towards the connection tube 10, and is then discharged by the collector shaft situated on the axis of the filter, whereas the solid materials continue to be applied against the outer face of the filtering fabric 3 in the form of "caking".

By rotation of the disk, the filtration-aspiration phase is followed by a phase of cleaning-blowing of the filtering fabric 3, during which the inner volume of the filtering sector 30 is subjected to pressure by compressed air, which detaches the caking from the sector by passing through the filtering fabric 3.

The filtration flow rate and yield are enhanced or optimized by the global decrease in the inner volume of the sector 30, by reducing its thickness at the outer edge 11 of the sector, whilst maintaining a sufficient cross-section at the mouth of its tube 10 for connection to the collector shaft.

The thickness of the inner volume of the filtering sector 30 thus vanes continuously along the entire radial length of the sector, and increases from the outer edge 11 to the mouth of the tube 10.

The profile of the draining support and thus of the sector is therefore tapered in the manner of a blade or a wing.

The invention claimed is:

1. A filtering sector for a filtering disk of a rotary filter, comprising:
    a structural element including a ribbed inner draining support and a frame surrounding the draining support, which is provided with a connection tube; and
    a filtering fabric which covers the structural element,
        wherein the structural element has a thickness that increases progressively in a direction of the connection tube, and the draining support includes a single ribbed metal sheet, defining parallel channels with side walls, and wherein the draining support is perforated by aligned perforated holes, the aligned perforated holes placed in the side walls of the parallel channels,
        wherein the frame is constituted by two identical shells having a plurality of wings and the two identical shells are fixed together by the plurality of wings at a central axis of the sector, while confining the ribbed metal sheet.

2. The filtering sector as claimed in claim 1, wherein the frame only includes two shells produced by stamping.

3. The filtering sector as claimed in claim 2, wherein the two shells of the frame have a profile in the form of a "U" with sides with a progressive length.

4. The filtering sector as claimed in claim 3, wherein the draining support has channels in the form of a "U".

5. The filtering sector as claimed in claim 3, wherein the draining support has channels in the form of a "V".

6. The filtering sector as claimed in claim 2, wherein the draining support has channels in the form of a "U".

7. The filtering sector as claimed in claim 2, wherein the draining support has channels in the form of a "V".

8. The filtering sector as claimed in claim 1, wherein the draining support has channels in the form of a "U".

9. The filtering sector as claimed in claim 1, wherein the draining support has channels in the form of a "V".

10. A rotary filter, comprising:
    the filtering sector as claimed in claim 1.

11. The filtering sector as claimed in claim 1, wherein the two identical shells of the frame are connected to one another by at least two transverse reinforcements arranged on both sides of the ribbed metal sheet.

12. The filtering sector as claimed in claim 1, wherein the two identical shells are symmetrical shells and the wings constitute reinforcements, and are welded to one another.

13. The filtering sector as claimed in claim 12, wherein an end of the shells is bent after stamping in order to form an end of the frame, and wherein the two shells of the frame are connected by the wings and by the bent end of the frame constituting transverse reinforcements in order to prevent risks of deformation of the sector.

14. The filtering sector as claimed in claim 1, wherein the draining support is perforated by aligned holes, transverse to a radius of the sector, a diameter of which increases in phase with the thickness of the structural element.

15. The filtering sector as claimed in claim 1, wherein the channels form a series of parallel corrugations, and wherein a pitch of the corrugations, i.e. the distance which separates two consecutive corrugation tops, remains invariable along the length of the draining support.

* * * * *